April 25, 1939.    K. S. IRVINE    2,155,600
SCALE AND INDICATING MEANS FOR USE IN CONNECTION THEREWITH
Filed Aug. 9, 1937    2 Sheets-Sheet 1
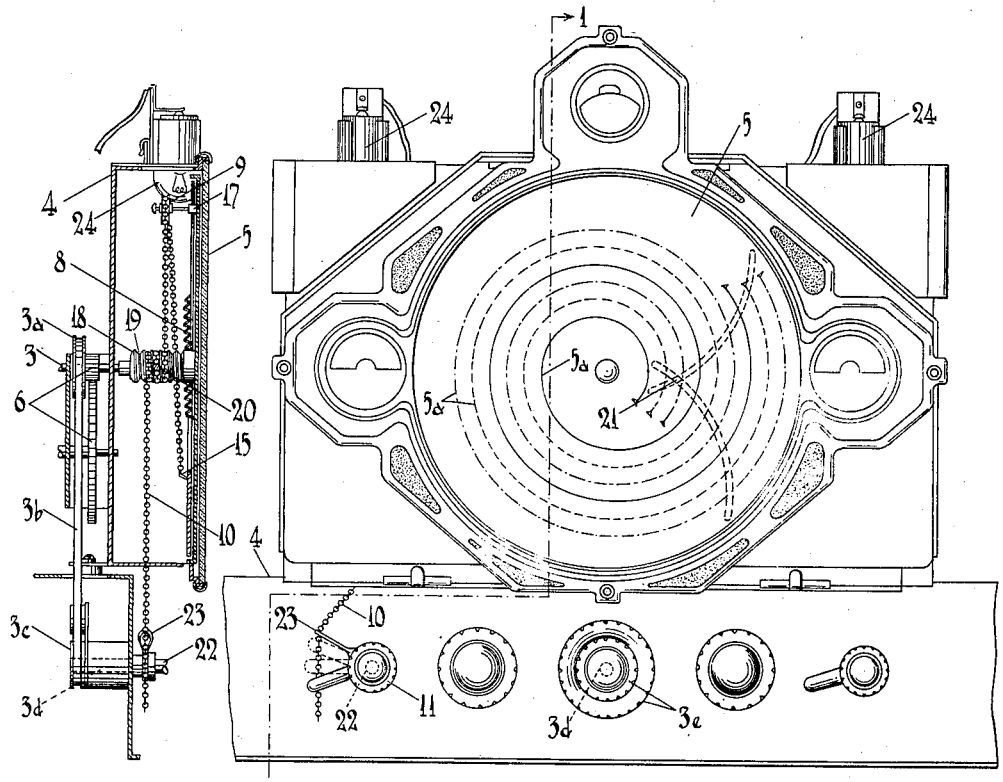
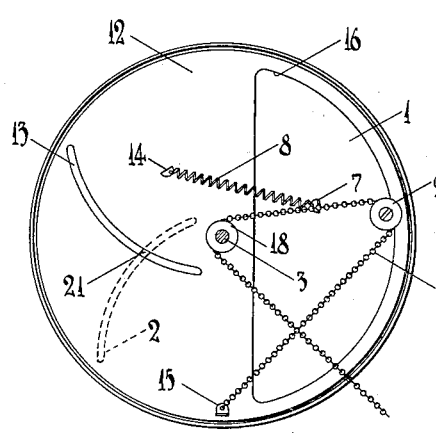
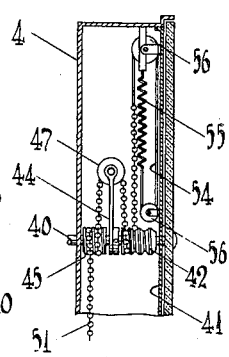
K. S. Irvine
INVENTOR
By: Glascock Downing & Seebold
ATTYS April 25, 1939.　　　　K. S. IRVINE　　　　2,155,600
SCALE AND INDICATING MEANS FOR USE IN CONNECTION THEREWITH
Filed Aug. 9, 1937　　　　2 Sheets-Sheet 2
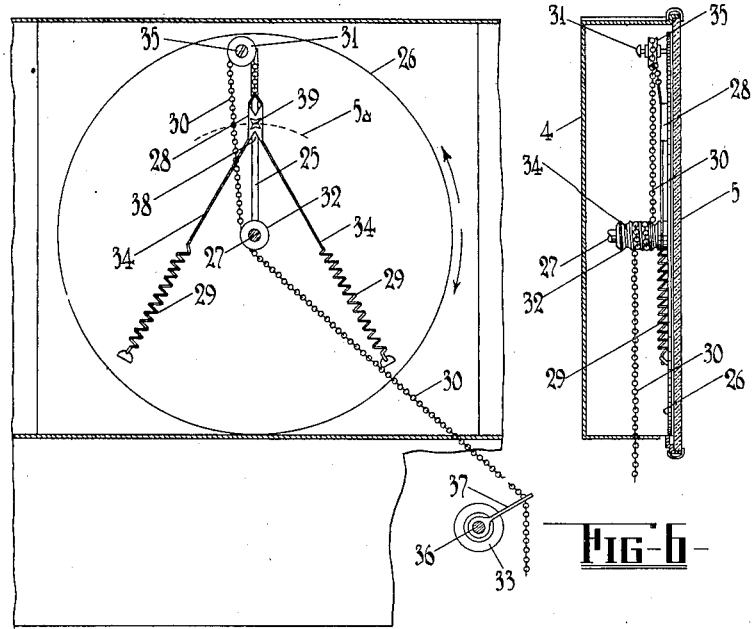
FIG-5-　　FIG-6-
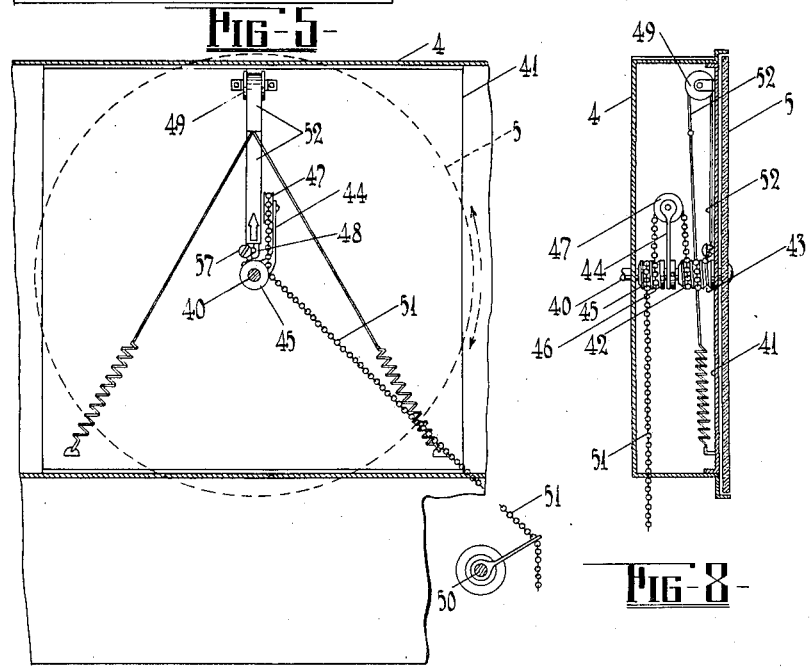
FIG-7-　　FIG-8-
K. S. Irvine
Inventor
By Glascock Downing & Seebold
Attys.

Patented Apr. 25, 1939

2,155,600

UNITED STATES PATENT OFFICE 2,155,600

SCALE AND INDICATING MEANS FOR USE IN CONNECTION THEREWITH

Keith Sandison Irvine, Wellington, New Zealand

Application August 9, 1937, Serial No. 158,263
In New Zealand September 9, 1936

6 Claims. (Cl. 116—124.1)

This invention relates to scales and means for use in indicating calibrations on scales.

An object of the invention is to provide a scale which may be manifold in its purpose for specific uses and which is plotted to give large numbers of calibrations or markings or the like, in a small confined space in respect of each use; and further, so that such calibrations or the like, are traversed by an indicating means which is arranged to record or to show a reading for whichever specific use the scale is being employed, so that said means is situated and operated within the said small confined space occupied by the calibrations, or other markings.

According to this invention a course of a scale or courses of scales in juxtaposition is or are plotted in a spiral or helical manner so that calibrations or like markings for a scale are arranged to follow the spiral or helical formation of the course or courses, and other calibrations or like markings for specific purposes may be arranged outside and/or inside the first course of calibrations to make scales adaptable for use with an indicating means constructed to be changed to and to indicate against any particular one of courses of the calibrated or marked scales, and against the latter's calibrations or other markings.

As applied to two specific purposes as for long wave and short wave indicating on a dial of a wireless receiver, the scales are plotted in a spiral and helical manner with calibrations or like markings for long wave and short wave in juxtaposition, preferably on a coloured translucent or transparent scale carrying member or dial, and a light aperture or other indicator is constructed, situated and arranged to move in connection or association with the course of any one of said scales, so that at any position on the course of one scale the light aperture can be moved to the other scale and thereafter to move with the latter's course on the dial as aforesaid.

The invention will now be described as applied to a wireless or radio receiver and reference will be made to the accompanying drawings in which:

Figure 1 is a front elevation of a wireless receiver frame removed from a cabinet, said frame supporting a dial mounting with dial mouldings and one form of the scale for the dial, Figure 2 is a side elevation of Figure 1 taken through line 1, 2 in the directions pointed by the arrow heads, Figure 3 is a back elevation of Figure 1 with the dial mounting and frame removed, Figure 4 is a diagrammatic representation of the slots in relation to a scale marking with the slots enlarged and crossing to form the light aperture in the shape of a pointer, Figure 5 is a back elevation of an alternative form to Figure 2, Figure 6 is a side view of Figure 5, Figure 7 is a back elevation of a further alternative form to Figure 2, Figure 8 is a side view of Figure 7, Figure 9 is a side view of an alternative means of gaining a light aperture.

In the form of the invention illustrated in Figures 1, 2, 3 and 4, the light aperture is gained by laying arcuate slots across each other in reverse directions to form a diamond shaped aperture, and arranging the slots so that they alter their diametrical relationship to each other as they are rotated upon a common axis.

As a variation in this form of the invention, one or both slots may be enlarged so that an increase in the size of the aperture is attained more particularly lengthwise so that the aperture assumes the dimensions and shape of a pointer.

With reference to these four figures, they illustrate such construction for gaining the variations in the diametrical relationship of rotated slots, by having a front plate 1, in which an arcuate slot 2 is made; the plate 1 is keyed to a spindle 3, which is rotatably mounted in a frame 4 which is provided with a light-reflecting surface at the back and a scale carrying disc 5 in front, so that plate 1 is between a scale carrying means 5 and the light reflecting background of the frame 4. The spindle 3 is operated by a pulley 3a keyed to the spindle 3 carrying a belt 3b which is actuated by a pulley 3c affixed to a driving spindle 3d, operated from outside the cabinet by turning either one of knobs 3e, said spindle 3 operates a gear train 6, in accordance with predetermined positions of variable condensers or like component parts (not shown) of the receiver relative to the calibrations of a scale carried on the member 5, so that the front plate 1 can be rotated the requisite number of turns in accordance with the turns comprising the course 5a of spiral or helical scale or scales carried on the member 5. The front plate 1 has an anchor 7 holding one end of a compression or like spring 8, and has a guide or sheave 9, to take a loop of a flexible connection 10 having an adjustable anchor 11 in the frame 4. A back plate 12, in which an arcuate slot 13 is made (in reverse direction to the arcuate slot 2 in the first mentioned plate 1), is loosely fitted upon said spindle 3, so that by sliding plates 1, 12 across each other even as they are rotated on or around the spindle 3, the relationship of the plates 1, 12 and the slots 2, 13 in the plates, can be varied. The back plate 12 has an anchor 14 for the other end of the compression spring 8 whereby the latter forms a variable connection between the front and back plates, and returns the plates 1, 12 and their slots 2, 13 to their normal relationship upon release of the flexible connection 10 as hereinafter provided. Further, the back plate 12 has an end of the flexible connection 10 affixed to it by anchor 15; and said plate 12 has a cut away portion 16 preferably of a D formation, so that upon alteration of the relationship of the plates 1, 12, the arcuate slots 2, 13 can move past each other in either direction before the back plate 12 contacts with a mounting 17 of the guide or sheave 9, or contacting anchor 7 of the spring 8 on the front plate 1.

A bushing or drum 18 preferably grooved to form a peripheral worm 19, is also loosely fitted on the spindle 3, and said bushing or drum 18 has the flexible connection 10 looped or wound on it as the flexible connection 10 passes over the guide or sheave 9 and the latter is rotated with the front plate 1. The flexible connection 10 may be attached to the bushing or drum 18 by a pin 20. Thus a turning movement of the front plate 1 in one direction carries the back plate 12 with it and guides and winds the flexible connection 10 upon the worm 19 of the bushing or drum 18 and gradually the flexible connection 10 is shortened to vary the relationship of the plates 1, 12 and the slots 2, 13 therein against the tension of the spring 8 connecting the plates 1, 12. Turning the front plate 1 in the reverse direction and carrying the back plate 12 with it unwinds the flexible connection 10 from the worm 19 of the bushing or drum 18 and the lengthening flexible connection 10 allows the spring 8 to vary the relative positions of the plates 1, 12 and the relative positions of the slots 2, 13 to give an aperture 21 made by the slots 2, 13, a greater or less diameter from the common axis of the plates 1, 12.

The adjustable anchor 11 aforesaid is made to provide movement of the aperture 21 from one of course 5a of calibrations or markings made on a scale carrying means 5, to another course of calibrations or markings in juxtaposition, also made on the scale carrying member 5. In one form of such an adjustable anchor 11, a holding post 22 pivoted over stops (not shown) in the frame 4, has an arm 23 to which an end of the flexible connection 10 aforesaid is anchored. Said holding post 22, may also operate any known means for gaining the change over from one wave length of a wireless receiver to another, the turning of the arm 23 for this latter purpose, also shortening or lengthening the flexible connection 10 suddenly to alter the relationship of the plates 1, 12 and their slots 2, 13 without a compensating turning movement of the plates 1, 12 by the spindle 3. Thus the aperture 21 is given a sudden increase or decrease in diameter to change-over from one of courses 5a of juxtapositioned spiral or helical scales to another one of courses 5a, in accordance with any one of prearranged wave lengths of the receiver.

In Figure 4 of the drawings, the slot 2 of the front plate is enlarged as aforesaid, as compared with the slot 13 in the back plate whereby the light aperture 21 is enlarged and forms a pointer to a course 5a of a calibrated scale.

Such enlargement may be complementary to both the slots 2, 13 and may be in the form of a leaf with a concave base, and it may be in any other formation to produce a pointer effect on the scale dial. In the diagrammatical form illustrated in Figure 4, the slots 2, 13 are enlarged so that the crossed edges of said slots disclose a leaf formation with concave base and an apex serving as an indicator or pointer for registering against a scale dial.

Electric lamps 24 wired in any well known manner to a source of electrical supply are arranged preferably in the upper part of the frame 4 to give a reflected or direct light through the aperture 21 at all positions of the latter.

In the form of the invention adaptable for use with a wireless receiver according to Figures 5 and 6 of the drawings, the light aperture for a spiral or helical course or courses of a scale 5a on a scale carrying member 5, is gained by a radial slot 25 in a plate or disc 26, the latter being turnable by a spindle 27 rotatably mounted in the frame 4 of the wireless receiver; and a shutter 28 movable along said slot 25 against a compression or like spring or springs 29 by a flexible connection 30 having one end attached to said shutter 28 and passed over a guide or sheave 31 and round a bushing or drum 32 which is loosely mounted on the spindle 27 supporting said plate or disc 26, and having the other end of the flexible connection 30 attached to an anchor 33 in the frame 4 of the wireless receiver. Retaining guides for the shutter may be affixed adjacent the slot 25. The compression or like spring or springs 29 is or are attached to the plate or disc 26, and when two springs 29 are employed, their attachments to the plate or disc 26 are sufficiently apart on the plate or disc 26 to enable the springs 29 and/or their connections 34 to converge past the spindle 27 of the plate or disc 26 and connect with the inner end of the shutter 28. The guide or sheave 31 is situated near the outer end of the radial slot 25 and is rotatably mounted on a pin 35 attached to and projecting from the plate or disc 26 to one side of the said slot 25 so that the flexible connection 30 passes along behind the slot 25 to connect with the outer end of the shutter 28. Preferably the bushing or drum 32 is grooved to form a peripheral worm 34 to receive the flexible connection 30 as the latter is wound upon the worm 34 by turning the spindle 27 and the plate or disc 26 keyed to the spindle 27. The anchor 33 of the flexible connection 30 may be adjustable by an operator to provide movement of the light aperture from one of the courses 5a of calibrations or markings made on the scale carrying member 5 to another course of calibrations or markings in juxtaposition also made on the scale dial. Such an adjustable anchor 33 has a holding post 36 pivoted over stops (not shown) in the frame 4 of the wireless receiver and has an arm 37 to which an end of the flexible connection 30 is attached. Said holding post 36 may also operate any known means for gaining the change over from one wave length of a wireless receiver to another wave length, such as from a short wave band to a broadcast band and vice versa; the turning of the arm 37 for this latter purpose also shortening or lengthening the flexible connection 30 suddenly to alter the position of the shutter 28 along the slot 25 and therefore the relationship of the shutter 28 with the plate or disc 26 and the light aperture disclosed by the shutter 28 and made by the said slot 25 as regards the respective scale courses. The shutter 28 may be in the form of an hour glass in cross section having the narrow neck thereof registering with the slot 25, so that the narrow neck portion of the shutter 28 registers against one of the courses of the scale as aforesaid and the indentations 38 of the said narrow neck, together with the exposed portions of the slot on either side of the shutter 28, make a divided light aperture which has pointed arrow heads represented by the indentations 38 indicating a particular one of said courses of the scale dial when light is projected through said exposed parts of the said slot 25.

The narrow neck portion of the shutter 28 may be holed such as in the form of a star 39 to make a precise indicating aperture against a course on the dial scale.

In another form of the invention adaptable for use with a wireless receiver according to Figures 7 and 8 of the drawings, the scale carrying member 5 containing the course or courses 5a of calibrations or markings is turnable before a light aperture which is variable to indicate against a course or courses aforesaid or to pass from one course to another. The turnable scale carrying member 5, Figures 7 and 8, is keyed on a spindle 40 which is rotatably mounted in the frame 4 of a wireless receiver, said spindle 40 being geared to condensers or like component parts of said receiver, so that the spindle 40 is turnable as described with reference to Figures 1, 2 and 3, by an operator adjusting said parts. Affixed in the frame 4 of the wireless receiver behind the scale carrying member 5 is a plate 41 through which the spindle 40 passes. Behind the plate 41 and loosely mounted on the spindle 40 is a drum 42 having a peripheral worm 43, and behind the drum 42 is an arm 44 keyed to the spindle 40 and behind the arm 44 is another drum 45 loosely mounted on the spindle 40 and having a peripheral worm 46. In the end of the arm 44 is rotatably supported a sheave 47 at right angles to the axis of the spindle 40. The plate 41 has a radial slot 48 and near the outer end and on the back of which is rotatably mounted a guide or sheave 49. A holding post 50 for a flexible connection 51 may be constructed and adjustable as indicated in the preceding forms herein; and the said flexible connection 51 by being passed round the last mentioned drum 45, over the sheave 47 in the arm 44 keyed to the spindle 40, round the first mentioned drum 42 and round the guide or sheave 49 on the plate 41, can be passed round a guide pin 57 and be adapted to operate a shutter 52 over the slot 48 in the plate as described in the preceding form herein, as the arm 44 and sheave 47 turning with the spindle 40 and the scale carrying member 5 shortens the flexible connection 51, by winding the latter on the drums 42 and 45. Or as a variation in the last mentioned form illustrated in Figure 9, the plate end of the flexible connection 51 may be attached to a flexible material such as a marked or holed translucent film 54 held by a spring 55 and mounted on rollers 56, so that said material or film marked or arranged to allow a beam of light to pass therethrough, indicates by the latter against a turnable scale carrying member 5 to point to a particular course of a scale and change from one course to another by shortening the flexible connection 51 and by turning the latter's holding post 50 and arm as described above herein.

While the nature of the invention has been described in connection with forms of indicating means applicable to a wireless receiver, it is to be understood that this invention is not confined to that particular means for altering the diametrical position of the indicating means for a spiral or helical scale, or scales in juxtaposition; but the invention is particularly concerned with a scale or scales arranged in a spiral or helical manner for any purpose where a large number of calibrations or markings on one or more courses are desired in a small, confined space.

What I do claim and desire to obtain by Letters Patent of the United States of America is:

1. In a device for varying and indicating the angular position of a rotatable member, a translucent dial having a calibrated scale course thereon in the form of a spiral, a source of light, a spindle, a front plate fixed to the spindle between the dial and the light source, a back plate rotatably mounted on the spindle between the front plate and the source of light, each plate having an arcuate shaped slot therein, said slots being arranged to cross and provide a pointed aperture permitting light from the source to pass therethrough, means for rotating one plate with respect to the other plate whereby the pointed aperture will be moved radially and circumferentially to follow a spiral course corresponding to the scale course of the dial.

2. In a device for varying and indicating the angular position of a rotatable member, a translucent dial having a scale course thereon in the form of a spiral with markings along the course, a source of light, a front plate secured to the rotatable member between the dial and the source of light, a back plate mounted on the rotatable member between the front plate and the light source, each plate having an arcuate shaped slot therein, said slots being arranged to cross and provide a pointed aperture extending through both plates, yieldable means connecting the plates for causing relative movement of the plates in one direction, and flexible means for effecting relative movement of the plates in another direction, whereby the aperture through the plates is moved in a spiral path corresponding to the spiral of the dial scale course.

3. In a device for varying and indicating the angular position of a rotatable member, a translucent dial having a calibrated scale course plotted thereon in the form of a spiral, a source of light, a spindle, a front plate keyed to the spindle, a back plate rotatably mounted on the spindle, both plates being arranged between the dial and the source of light and each having an arcuate slot therein, said slots extending in opposite directions and crossing each other to provide an aperture through both plates, a spring for urging relative movement of the plates in one direction, a grooved drum mounted on the spindle and a flexible connection wound on said drum and engaging the plates for effecting relative movement of the plates in an opposite direction whereby the aperture through the plates is moved in a spiral path corresponding to the spiral on the scale course of the dial.

4. In a device for varying and indicating the angular position of a spindle, a translucent dial having a calibrated scale course spirally arranged thereon, a source of light, an opaque disc mounted on the spindle between the light source and the dial, said disc having a radially extending slot therein, a shutter having an aperture therein movable along said slot, means for rotating the disc, and means for moving the shutter radially in one direction during rotation of the disc and means for moving the shutter radially in an opposite direction during reversed rotation of the disc whereby the aperture moves in a spiral path corresponding to the spiral form of the scale course.

5. In apparatus according to claim 4 wherein the means for moving the shutter in one radial direction comprises two springs arranged laterally of the spindle with each spring engaging the shutter and the disc, and the means for moving the shutter in an opposite radial direction comprises flexible means engaging the shutter and adapted to be wound on the spindle.

6. In a device for varying and indicating the angular position of a rotatable member, scale carrying means having a calibrated scale course plotted thereon in the form of a spiral, other scale courses arranged on the scale carrying means concentric with the first mentioned course, means independent of the scale carrying means adapted to provide an indication on any one of the scale courses, manually operable means, means arranged remote of the scale carrying means and associated with said manually operable means for moving the means independent of the scale carrying means in a spiral path corresponding to the spiral path of one scale course, and flexible means for shifting the means which provides an indication adjacent any one of the concentric spiral scale courses so as to follow the course of the selected spiral scale upon operation of the manually operable means.

KEITH SANDISON IRVINE.